United States Patent [19]

Levine et al.

[11] 4,321,087

[45] Mar. 23, 1982

[54] PROCESS FOR MAKING METALLIC LEAFING PIGMENTS

[75] Inventors: Sol Levine, Morristown; Melvin E. Kamen, Woodcliff Lake; August DeFazio, Englishtown; Peter Cueli, Somerville, all of N.J.

[73] Assignee: Revlon, Inc., New York, N.Y.

[21] Appl. No.: 126,011

[22] Filed: Feb. 29, 1980

Related U.S. Application Data

[63] Continuation-in-part of Ser. No. 971,708, Dec. 21, 1978, abandoned.

[51] Int. Cl.³ ............................................... B22F 9/00
[52] U.S. Cl. ............................. 75/0.5 A; 75/0.5 AA; 106/290; 241/13; 241/16; 241/19; 264/81; 264/130; 427/251; 427/357; 427/405
[58] Field of Search ............... 264/81, 130, 144, 143; 106/290; 75/0.5 R, 0.5 A, 0.5 B, 0.5 AA, 0.5 BA; 427/250, 251, 357, 404, 405, 406; 241/13, 16, 19

[56] References Cited

U.S. PATENT DOCUMENTS

| | | | |
|---|---|---|---|
| 1,915,473 | 6/1933 | Raney | 75/0.5 A |
| 2,839,378 | 6/1958 | McAdow | 106/290 |
| 2,941,894 | 6/1960 | McAdow | 106/290 |
| 3,531,316 | 9/1970 | Sternasty | 428/352 |
| 3,666,516 | 5/1972 | Dunning | 428/352 |
| 3,692,731 | 9/1972 | McAdow | 106/290 |
| 3,697,070 | 10/1972 | McAdow | 106/290 |
| 3,949,139 | 4/1976 | Dunning et al. | 428/458 |
| 3,962,397 | 6/1976 | Narui et al. | 264/144 |
| 4,058,644 | 11/1977 | DeVries et al. | 428/424 |
| 4,100,317 | 7/1978 | Narui et al. | 264/81 |
| 4,116,710 | 9/1978 | Heikel | 106/290 |

*Primary Examiner*—Michael L. Lewis

[57] ABSTRACT

A continuous process for preparing finely divided thin, bright metal particles which comprises applying a release coating to at least one side of a carrier sheet, depositing a metal film of from 350 to 450 angstroms thickness onto the release coating solubilizing the release coating, removing the metal film from the carrier sheet, and breaking the thin metal film into particles having a diameter of between 25 to 50 microns.

13 Claims, 3 Drawing Figures

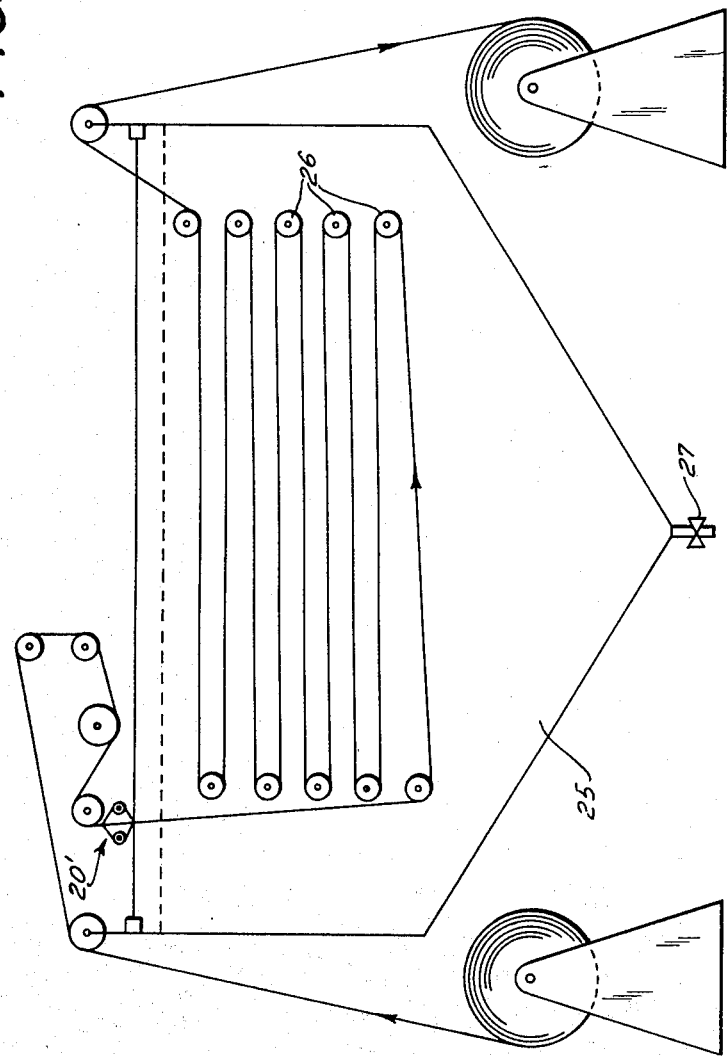

PROCESS FOR MAKING METALLIC LEAFING PIGMENTS

BACKGROUND OF THE INVENTION

Field of the Invention

This is a continuation-in-part of application Ser. No. 971,708, filed Dec. 21, 1978 and now abandoned.

This invention relates to a process for producing metallic leaf pigments and to the use of these pigments in printing inks and coatings. More particularly, this invention relates to a continuous process for producing thin, bright metallic leaf pigments.

The use of metal coatings for decoration and ornamentation began several thousand years ago, but only within the last hundred years have metallic pigments become important commercially. Historically, the value of surfaces covered with gold or other metals resided not only in an aesthetic, bright, metallic finish, but such surface coatings were able to withstand the ravishes of time and weathering of the elements better than any other type of surface coating available. Due to the high cost of gold or other metals, it became difficult to produce a suitable thin leaf, and the use of metallic coatings was limited to jewelry, porcelain, chinaware and other art objects. In order to produce thin leaf or coating of metal that was but a few thousandths of an inch thick, it was necessary to begin with a ductile metal that was already hammered into extremely thin sheets. These sheets were then interleaved with animal skins and further hammered until the resultant foil was fine enough to be used. During this process the edges of the thin leaf broke off into small particles. It was then found that by mixing these small fine flakes with a drying oil, a finish could be obtained that came close to resembling a continuous sheet of metal. The artisans who worked with this type of finish prepared their metallic pigments by rubbing the finely hammered metal through a fine metal mesh.

During the mid 1800's, Bessemer produced the first practical and economical method to manufacture metallic flake pigments. This was accomplished by stamping or hammering metal sheets of appropriate brightness and then reducing the sheets into flake form which were graded and collected.

Charles Hall and Paul Herroult independently invented a practical aluminum smelting process in 1886 causing aluminum to be available in commercial quantities. Aluminum was technically adaptable to the Bessemer process but the drawback was that it formed an explosive mixture with air over a wide range of metal-air ratios.

In 1925, Everett Hall was granted a number of patents for producing a safe and superior aluminum flake pigment. This Hall process, based on a wet ball mill, carried out the size reduction of aluminum in the presence of a paint thinner containing a lubricant in solution. The lubricant was used to prevent heat cohesion of the fine flakes and the choice of lubricants determined the type of flake formed. In this process, the explosive potential from the finely powdered aluminum was minimized and a large scale commercial manufacturing process was developed. An example of the results of this invention was the paint used in 1931 to cover all structural parts of New York's George Washington Bridge.

Metallic coatings are presently obtained by using conventional aluminum flake and powder pigments dispersed in inks and then applied graphically. The metallic pigments are obtained by condensation of metallic vapors, electroplating, direct vacuum sputtering or transferred with the use of foil leaf. The coatings using conventional aluminum pigments are gray, or at best very low reflective coatings. The coatings are typically expensive, the processes difficult to control, and the processes do not lend themselves to high volume continuous coating applications. Examples of metallic coating compositions and processes for making metallic pigments are disclosed in U.S. Pat. No. 2,941,894 to McAdow, U.S. Pat. No. 2,839,379 also to McAdow, and U.S. Pat. No. 4,116,710 to Heikel.

Diagrams illustrating aluminum pigments production as it exists today is described in FIG. 16 on p. 799 of Pigment Handbook, Volume 1 of J. Wiley & Sons, New York and FIG. 5 on p. 5 of Section FA2C-1, Powder and Pigments, July 1976, Alcoa Aluminum Pigments Product Data.

Aluminum pigments, prepared as described above, have been used for some years in paints, enamels, lacquers and other coating compositions and techniques. The various grades of fineness of conventional aluminum pigments from relatively coarse particle sizes such as 250 microns (60 mesh) to about 44 microns (325 mesh).

A drawback of conventional aluminum and metallic pigments produced today is their nugget-like shape. In formulating compositions containing the conventional shaped aluminum pigments, different particle sizes, concentrations as high as 30% by weight are usual. Due to the geometric shape of the aluminum pigment particles, the particles tend to protrude from the surface of the ink or paint vehicle after drying causing a phenomenon called "dusting" which occurs when the dried coating is rubbed, thereby removing some of the metallic residue. In addition, because the pigment particles do not lie flat and are randomly distributed, the plate out is usually not uniform and requires multiple coats or applications. An additional drawback is the milling entailed in the process of size reduction in which the original brightness of the metal deteriorates and the metal takes on a gray appearance.

It is the general object of the present invention to provide a process for making very thin, bright metallic pigments.

Another object of this invention is to provide a process for continuously making metallic flake pigments rapidly and inexpensively.

Still another object of the present invention is to provide coating and printing formulations containing the thin, bright metallic pigments of this invention.

These and other objects, features and advantages of the present invention will become evident from the following detailed description of the invention taken in conjunction with the drawings.

SUMMARY OF THE INVENTION

The objects of the present invention are achieved by a process in which a release coating is continuously applied to at least one side of a carrier sheet. Metal vapor is condensed in the form of a thin film of between 350 and 450 angstroms thickness onto at least one surface of the release coating. The carrier sheet having the release coating and the thin metal film thereon is then passed through a solvent system which dissolves the release coating; allowing most of the metal film to float off the carrier sheet into the solvent. The residual thin metal film is then wiped off the carrier sheet into a non-reactive liquid medium where it is dispersed into finer pigment particles by vigorous stirring or ultrasonics. The metallic pigment flake may then be concentrated and formulated in coating and printing compositions.

BRIEF DESCRIPTION OF THE DRAWINGS

FIG. 3 is an enlarged view of embodiment in detail of the stripping unit.

DETAILED DESCRIPTION OF THE INVENTION

Figure 2:
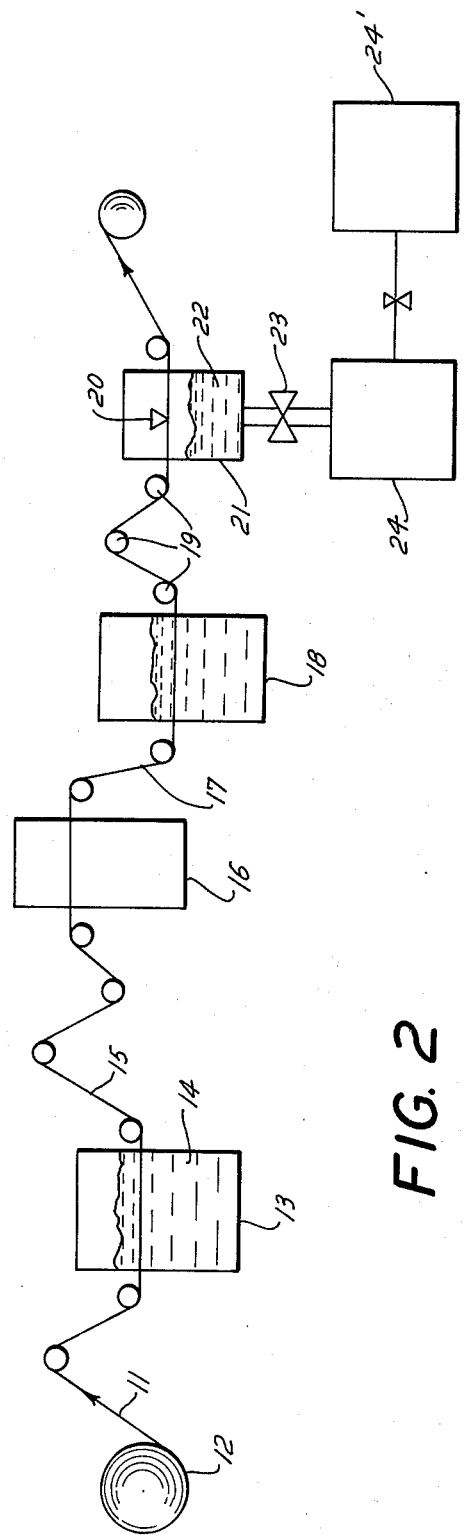
FIG. 2 is schematic representation of the process.

Referring now to the drawings and in particular FIG. 2, a carrier sheet 11 is continuously dispensed from roll 12 and passed into vat 13 through a solution wherein a release coating 14 is applied to at least one side of carrier sheet 11. Coated carrier sheet 15 is then passed through vacuum metallizing machine 16 and a thin metal film is deposited on at least one side of the coated carrier sheet. The metal film-coated carrier sheet 17 is passed through stripper 18 containing a solvent in which the release coating is soluble. The metal film-coated carrier sheet having the release coating solubilized is passed over rollers 19 and past a suitable wiper 20 in chamber 21, containing solvent 22. The wiper 20 totally removes the metallic film as thin flakes and the clean carrier sheet is rewound. The metallic flakes or pigments are allowed to collect in solvent 22 and may then be pumped 23 to settling tank 24, 24'. In FIG. 3 there is shown an alternative embodiment of the stripping chamber, vessel 25. The metallized carrier sheet is passed through wiper 20' and around rollers 26. The metal pigments are collected at the bottom of vessel 25.

Carrier sheet 11 may be a polyester film, for example, a polyethylene terephthalate sheet, such as Mylar ®, or other suitable sheet, such as cellophane or polypropylene.

Suitable release coatings include those materials which are easily solubilized and on which the metal film may be deposited. Examples of such release coatings include polymers, such as polyvinyl chloride, polystyrene, chlorinated rubber, acrylo-nitrile-butadiene-styrene copolymer, nitro-cellulose, methyl methacrylate, acrylic copolymers, fatty acids, waxes, gums, gels and mixtures thereof. Application of the release coating can be performed by solubilizing the coating material in a suitable solvent and applying with a standard continuous roll coating machine equipped to apply uniform thin coatings at commercially suitable speeds of 500 to 1000 feet per minute on each side. The coated carrier sheet is preferably dried until the solvents are removed. A suitable machine is a general purpose rotogravure coater equipped with roll-to-roll unwind/wind system, such as the Two Position Rotogravure Coater and Drying Tunnel manufactured by Inta-Roto Inc. of Richmond, Virginia. Best results are obtained by applying release coating in quantities of from 0.75 to 1.50 lbs. per ream, preferably about 1.0 lb. per ream (3,000 square feet). It is essential that the release coating not be applied in amounts greater than 1.50 lbs. per ream. Also if the coating is less than 0.25 lbs. per ream there will be insufficient release properties.

Coated carrier film 15 is passed through vacuum metallizing machine 16 and a metal film is deposited on one or both sides of the release coating. The thickness of the deposited metal film is from 350 to 450 angstroms and is controlled by the speed of the web and the power required for the evaporation rate. Suitable bright metals for deposition include aluminum, chromium, copper, steel, silver and gold. The metal is evaporated at rates of approximately 3.50 Ohms per square (resistance reading). This is equivalent to 350 angstroms on one sided coating or 7.0 Ohms or 700 angstroms on both sides.

The vaporation of the metal is carried out using such standard methods as induction, resistance, electronic beams and sputtering. The thickness of the deposited metal film is critical to obtain the bright particles. An extremely uniform, thin film is necessary to obtain maximum leafing properties. To obtain the desired continuous reflectiveness of the metallic particles the thickness of the film is from 350 to 450 angstroms. At a thickness above 450 angstroms the leafing properties of the particles begin to break down when put into a coating formulation. At a thickness below 350 angstroms the metal particles become too delicate to separate from the resin solvent stripping system.

Figure 1:
FIG. 1 is a block diagram of the process for producing the metal pigments of the present invention.

If desired, the carrier sheet having the thin metal film deposited thereon is stretched under tension by approximately 1 to 2% of its length causing cracks to form in the metal surface. This process as shown in FIG. 1 is referred to as energizing and permits about a two-fold acceleration of the subsequent stripping process.

The metallic-coated carrier sheet 17 is then passed into a solvent tank 18 containing the solvent in which the release coating is solubilized. Suitable solvents for solubilizing the release coating include acetone, chlorinated solvents such as methylene chloride, methyl ethyl ketone, methyl isobutyl ketone, toluene, butyl acetate and the like.

The metallic film coated carrier sheet is passed through solvent tank 18 and over a series of rollers 19 and past an air knife 20 or a suitable wiper which removes loose metal particles from the carrier sheet. The air knife may be in the same chamber 18 as the solvent but usually is in a separate chamber 21, as shown in FIG. 2, containing a solvent 22, which solvent may be the same solvent as in tank 18. It is essential that the solvent be non-reactive with the metallic pigment. A suitable air knife can be formed from a hollow tube fitted to a source of compressed air of approximately 90 PSI. Nozzles or fine holes are machined laterally and equally spaced along its length so when assembled the air jets project at a tangent to the moving carrier sheet. The air jets remove all residual metallic flakes that may remain on the film. The air knife also acts as a drying mechanism for the wetted carrier sheet thereby aiding in rewinding. In addition it may be desirable to use a vapor degreasing technique to totally remove both residual metal and release coating from the carrier sheet prior to rewinding. The vapor degreasing also cleanses any residual release coating from any remaining metal flakes. The air may be ambient, chilled or heated for optimum efficiency.

The solvent in tank 18 may be used until saturated. The solvent may then be recovered from the solution containing the coating material. The coating material can be reused in a subsequent coating operation if it is properly purified.

The pigment dispersed in the solvent is either allowed to settle in stripping tank 21 or transported by pump 23 to settling tanks 24, 24' or passed through a centrifuge so that a concentrated suspension of thin bright metallic pigment is obtained. The concentration of metallic pigment in solvent is preferably about 0.045%, but in any event the concentration does not exceed 0.2% prior to centrifuging.

The metallic pigment is then broken up into particles of which about 90% are from 25–50 microns in diameter. A preferred means for reducing the pigment to the proper particle size is a sonolator which operates by ultrasonic action and thereby does not destroy the reflectivity of the bright surface of the pigment particles. A suitable ultrasonic dispersion is the Triplex Sonolator System, Model A HP, Type A, Design 150 made by the Sonic Corp. of Stratford, Conn.

The thin, bright metallic pigment having a diameter from 25–50 microns is then concentrated to a pigment solids of from 5 to 15%. The concentrated pigment may then be formulated into a spray lacquer or a printing ink.

It has, however, been found preferable to further concentrate the metallic pigment by first using a solvent exchange with, for example, methyl cellosolve, followed by further concentration in a centrifuge wherein the metallic solids are collected at approximately 20%. This concentrate is then made into a lacquer or printing ink formulation at a metal concentration of from 1.0–5.0% by weight of the metal. The formulation is finally passed through a means which homogenizes the formulation and brings the ultimate metallic particle size to approximately 10–20 microns. It was surprisingly found that coating formulations containing from 1–5% by weight of aluminum pigments made according to the process of this invention gave continuous mirror finishes with excellent hiding power.

The metallic film obtained in this process resembles the brilliance, reflective gloss, and hiding power of commercial metallic foils. Due to the natural orientation of the single layer leafing flake, extremely small amounts of pigment will cover very large surface areas. For example, 130 grams of the solid aluminum brilliant leafing pigment of this invention converts to 1 gallon of printing ink and will yield excellent coverage of approximately 3,000,000 square inches with a #300 quadrangular cell rotogravure printing cylinder. The efficiency of the lay down is due to the ability of the product of this invention to reconstruct itself.

The following examples illustrate the practice of the above-described invention.

EXAMPLE 1

An aluminum pigment was made in the following manner. A release coat comprising 10% nitrocellulose in toluene was coated onto a ½ mil. thick Mylar ® carrier sheet with a 200 line quad rotogravure roll on a commercial roll coater and dried, leaving a glossy film of nitrocellulose on the carrier sheet. The coated carrier sheet was then metallized on a CVC Vacuum Roll Coater applying 400±50 angstroms of thickness of aluminum film. This metallized, coated carrier sheet was then passed through a stripping machine and a suspension of aluminum flakes was collected having a concentration of about 0.1% by weight of aluminum flakes. Solvents used in the stripping process were composed of 50% toluene and 50% methyl ethyl ketone (MEK). The aluminum flake containing suspension was then allowed to settle out and further concentrated to about 6% solids.

EXAMPLE 2

A ½ mil thick Mylar ® carrier sheet was coated with a 10% nitrocellulose solution in a commercial roll coater machine using a 100 line rotogravure roller. A second coating of chlorinated rubber was subsequently applied on top of the nitrocellulose. The coated carrier sheet was then metallized with 400±50 angstroms of aluminum and the metallized carrier sheet stripped in a bath comprised of 25% acetone, 25% toluene, 25% MEK and 25% butyl acetate. The metal particles were then concentrated to 6% solids aluminum.

EXAMPLE 3

A ½ mil thick cellophane carrier sheet was coated with an acrylic copolymer dissolved in toluene in an amount of approximately 1.0 lb. per ream. The coated sheet was subsequently metallized with 400±50 angstroms of aluminum and then stripped with a solution comprising 50% toluene, 40% MEK and 10% acetone. The aluminum flakes stripped easily and were bright.

EXAMPLE 4

A ½ mil thick polyester carrier sheet was coated on a commercial machine with about 1.0 lb. per ream per side of a release coating comprising a mixture of methyl methacrylate resin and acrylic copolymer dispersed in 50% MEK and 50% toluene. The coated sheet was then metallized with copper about 400 angstroms thickness. The release coat was solubilized with methylene chloride and the thin bright copper particles were collected.

EXAMPLE 5

A ½ mil thick polyester carrier sheet was coated on both sides with approximately 1.25 lbs. per ream of nitrocellulose dispersed in toluene. The coated carrier sheet was then metallized on both sides with 400±50 angstroms thickness of aluminum. The metallized carrier sheet was then stripped by dissolving the release coating in a solvent which comprised 45% MEK, 45% toluene and 10% acetone. The thin aluminum particles were collected in the solvent mixture.

EXAMPLE 6

A ½ mil thick Mylar ® carrier sheet was coated with nitrocellulose at about 1.0 lbs. per ream per side on a commercial coating machine then metallized with approximately 400±50 angstroms thickness of chromium. The nitrocellulose release coating was solubilized with a solution of 50% MEK and 50% toluene and the chromium flakes were stripped from the carrier sheet.

EXAMPLE 7

Products obtained from Examples 1 through 6 were placed in a centrifuge and spun at 13,000 to 16,000 rpm for 5 minutes. A pigment concentration of approximately 10 to 20% by weight of pigment was obtained when the supernate was removed.

EXAMPLE 8

The metallic pigments of Examples 1 through 6 obtained from the processing of Example 7 were passed through a sonolater using a 21 gap orifice. At least 90% of the particles were examined and found to have peripheral dimensions ranging from 25 to about 50 microns in diameter. Of course, the thickness of the particles remained about 400±50 angstroms. These metallic pigments were further concentrated to approximately 10% and passed through an ultrasonic disperser and were uniformly reduced to an optimum pigment dimension of between 10 to 20 microns.

EXAMPLE 9

The aluminum pigments of Example 7 treated according to Example 8 were formulated into a printing ink having the following formulation:

|  | Amount |
| --- | --- |
| Aluminum leafing pigment (on solids basis) | 5 gms. |
| Nitrocellulose | 1 gm. |
| Stearic Acid | 5 gms. |
| Methyl/ethyl cellosolve 60%/40% | 93.5 gms. |

A printing ink of this formulation using a 300 line screen roller then calendered with polished steel rollers at approximately 180° F. gave the same effect as applying hot stamping foil or aluminum foil to a laminated board.

EXAMPLE 10

An aluminum pigment made according to the process of this invention was made into a spray lacquer of the following formulation:

|  | Amount |
| --- | --- |
| Aluminum pigment | 1 gram |
| Acrylic binder | 0.5 grams |
| Wetting agent | 0.1 grams |
| Methyl/ethyl cellosolve 60/40% | 98.4 grams |
|  | 100.0 grams |

One gallon of lacquer basis on this formulation was found to satisfactorily yield approximated 350,000 to 400,000 square inches of sprayed surface when using conventional spray equipment.

While in order to obtain maximum coating effects and compatibility in printing, coating, lacquer and paint products, a fine particle size is usually required to obtain a highly reflective film, it is possible to use larger metallic leaf for other purposes. By reducing or eliminating the ultrasonic dispersion it is possible to obtain a sparkle-like effect at lower concentrations of pigments, and the resulting material is suitable for certain applications.

It is apparent that many widely varying embodiments of the process and product of this invention can be made without departing from the scope thereof, and it is not intended that the invention be limited except by the appended claims.

What is claimed is:

1. A continuous process for preparing finely divided metal particles comprising the steps of:
 (a) Applying a release coating onto at least one side of a continuous carrier sheet in an amount of from 0.75 to 1.50 lbs. of said release coating per ream per side of said carrier sheet,
 (b) depositing in the form of a thin film, a metal selected from the group consisting of aluminum, chromium, copper, steel, silver and gold, in an amount of from 350 to 450 angstroms thickness directly onto said release coating,
 (c) passing said carrier sheet with said release coating and said film of said metal through a solvent for solubiling said release coating but which is non-reactive with said metal,
 (d) removing said film of said metal from said carrier sheet in a particulate form to produce the metal particles substantially free of said release coating, and collecting the metal particles in a non-reactive solvent which is non-reactive with said metal.
 (e) concentrating the metal particles, and
 (f) breaking the metal particles into pigment particles having a particle size diameter between about 25 and 50 microns.

2. A process according to claim 1 wherein said selected metal is aluminum.

3. A process according to claim 2 wherein said carrier sheet is formed of polyethylene terephthalate.

4. A process according to claim 3 wherein said release coating is a member of the group consisting of polyvinyl chloride, polystyrene, chlorinated rubber, acrylonitrilebutadiene-styrene copolymer, nitrocellulose, cellophane, methyl metacrylate, acrylic copolymers, fatty acids, waxes, gums, gels and mixtures thereof.

5. A process according to claim 4 wherein said film of said metal is deposited on said release coating by vaporizing said metal and then condensing it.

6. A process according to claim 5 wherein said carrier sheet is stretched by 1 to 2% in length prior to removing said film of said metal.

7. A process according to claim 5 or 6 wherein said step of removing said film of said metal is carried out with an air knife.

8. A process according to claim 7 comprising the further steps of:
 (g) further concentrating said metal pigment particles from step (f) to produce a solids concentration of from 5% to 15%, and
 (h) reducing said pigment particles to a particle size diameter between about 10 and 20 microns.

9. A new process according to claim 1 wherein said solvent for solubilizing said release coating and said non-reactive solvent are identical to one another.

10. A process according to claim 9 wherein said solvent for solubilizing said release coating and said non-reactive solvent are contained together in a solvent vat.

11. A process according to claim 1 wherein said solvent for solubilizing said release coating and said non-reactive solvent are contained, respectively, in first and second vats, said second vat being arranged at an advantageously preselected location with respect to said first vat.

12. A process according to claim 1 wherein said step (f) of breaking said metal particles is performed by ultrasonic agitation of said metal particles.

13. A process according to claim 8 wherein said step (h) of reducing said pigment particles is performed by ultrasonic dispersion of said pigment particles.

* * * * *